(12) United States Patent
Chippada

(10) Patent No.: US 9,940,590 B2
(45) Date of Patent: Apr. 10, 2018

(54) SYSTEM AND METHOD TO GENERATE A TRANSACTION COUNT USING FILTERING

(71) Applicant: CA, Inc., New York, NY (US)

(72) Inventor: Venkata Naresh Chippada, Santa Clara, CA (US)

(73) Assignee: CA, Inc., New York, NY (US)

( * ) Notice: Subject to any disclaimer, the term of this patent is extended or adjusted under 35 U.S.C. 154(b) by 591 days.

(21) Appl. No.: 14/661,690

(22) Filed: Mar. 18, 2015

(65) Prior Publication Data

US 2016/0275420 A1    Sep. 22, 2016

(51) Int. Cl.
*G06Q 10/06*    (2012.01)
*G06F 17/30*    (2006.01)
*G06F 9/44*    (2006.01)

(52) U.S. Cl.
CPC ..... *G06Q 10/063* (2013.01); *G06F 17/30324* (2013.01); *G06F 17/30365* (2013.01); *G06F 17/30368* (2013.01)

(58) Field of Classification Search
CPC ......... G06F 17/30324; G06F 17/30365; G06F 17/30368; G06Q 10/063
USPC ....................................................... 717/124
See application file for complete search history.

(56) References Cited

U.S. PATENT DOCUMENTS

| | | | | |
|---|---|---|---|---|
| 6,732,124 B1* | 5/2004 | Koseki | ............... | G06F 11/1435 714/15 |
| 9,697,219 B1* | 7/2017 | Wang | ............... | G06F 17/30144 |
| 2004/0030796 A1* | 2/2004 | Cooper | ............... | H04L 41/069 709/231 |
| 2004/0042470 A1* | 3/2004 | Cooper | ............... | H04L 41/046 370/401 |
| 2010/0174670 A1* | 7/2010 | Malik | ............... | G06F 17/30705 706/12 |

* cited by examiner

*Primary Examiner* — Ryan Coyer
(74) *Attorney, Agent, or Firm* — Vierra Magen Marcus LLP

(57) ABSTRACT

The present disclosure relates to a system and method of generating a transaction count using filtering. Transaction data is collected for a set of transactions from an original data set. The collected transaction data is narrowed into a transaction data set by identifying a specific range of the data to be extracted. This transaction data set is filtered against one or more criteria. The transactions included in the transaction data set are then arranged into data packs in a format enabling efficient count generation. The count generation determines how many transactions meet the applied criteria. The data may then be efficiently stored in a database for later retrieval.

27 Claims, 14 Drawing Sheets

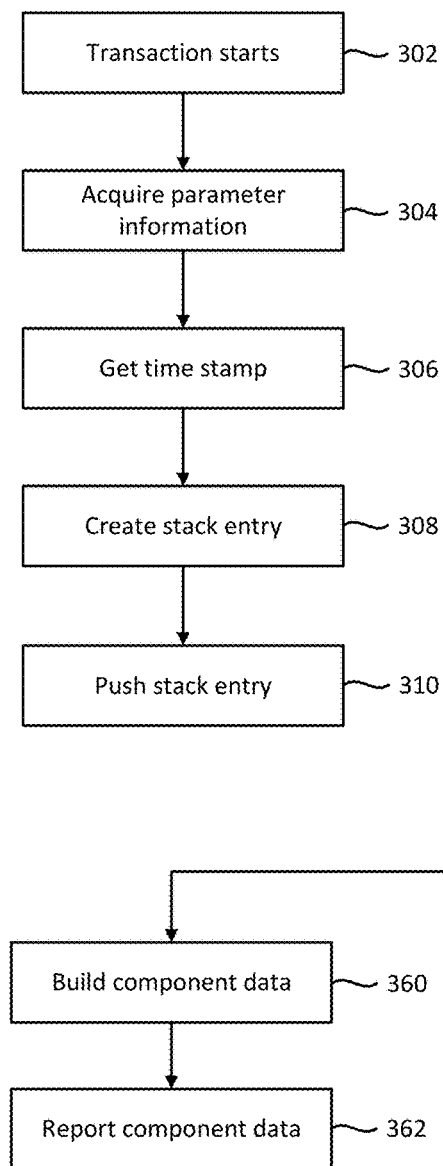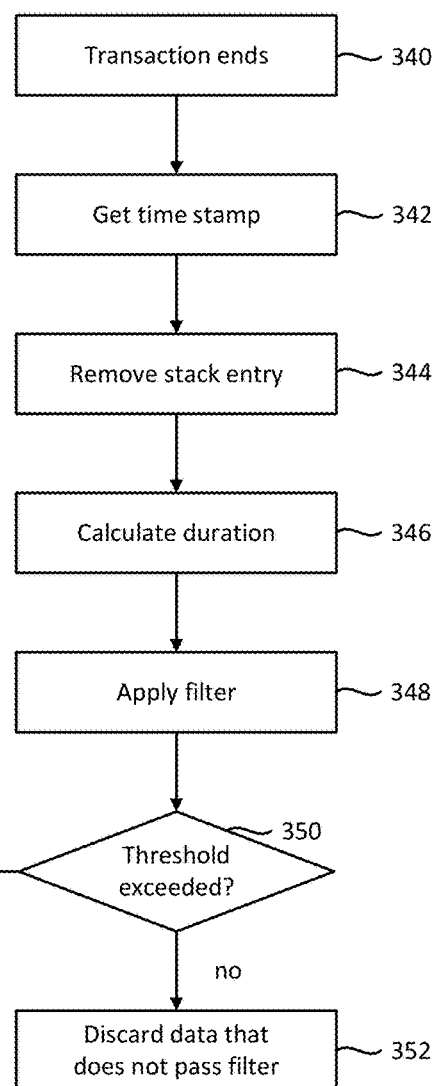

| Key (parameter_value) | Value ([count,bitmap]) | Description |
|---|---|---|
| 27 | [2, {1,0,0,0,1,0,0,0,0,0}] | There are 2 transactions with the value '27' |
| 45 | [6, {1,1,1,0,1,0,1,1,0,0}] | There are 4 (6-2) transactions with the value '45' |
| 56 | [9, {1,1,1,0,1,1,1,1,1,1}] | There are 3 (9-6) transactions with the value '56' |
| 1001 | [10, {1,1,1,1,1,1,1,1,1,1}] | The last entry has all bits as '1' such that all transactions are covered |

| Key (parameter_value) | Value ([count,bitmap]) | Description |
|---|---|---|
| 11-20 | [2, {1,0,0,0,1,0,0,0,0,0}] | There are 2 transactions falling the range 11-21 |
| 21-30 | [6, {1,1,1,0,1,0,1,1,0,0}] | There are 4 (6-2) transactions falling in the range 21-30 |
| 31-40 | [9, {1,1,1,0,1,1,1,1,1,1}] | There are 3 (9-6) transactions falling in the range 31-40 |
| 41-50 | [10, {1,1,1,1,1,1,1,1,1,1}] | The last entry has all bits as '1' such that all transactions are covered |

| Key = STATE (parameter_value) | Value ([count,bitmap]) | Description |
|---|---|---|
| MD | [2, {1,0,0,0,1,0,0,0,0,0}] | There are 2 transactions occurring in MD |
| CA | [4, {0,1,1,0,0,0,1,1,0,0}] | There are 4 transactions occurring in CA |
| TX | [3, {0,0,0,0,1,0,0,0,1,1}] | There are 3 transactions occurring in TX |

| Duration | T1 | T2 | T3 | T4 | T5 | T6 | Comment |
|---|---|---|---|---|---|---|---|
| 27 | 1 | 0 | 0 | 1 | 0 | 0 | T1 and T4 has value 27 |
| 45 | 0 | 1 | 0 | 0 | 1 | 0 | T2 and T5 have value 45 |
| 56 | 0 | 0 | 1 | 0 | 0 | 0 | T3 has value 56 |

| Error | T1 | T2 | T3 | T4 | T5 | T6 | Comment |
|---|---|---|---|---|---|---|---|
| 1 | 0 | 0 | 1 | 0 | 0 | 0 | T3 has 1 error |
| 2 | 0 | 1 | 0 | 0 | 1 | 0 | T2 and T5 have 2 errors |

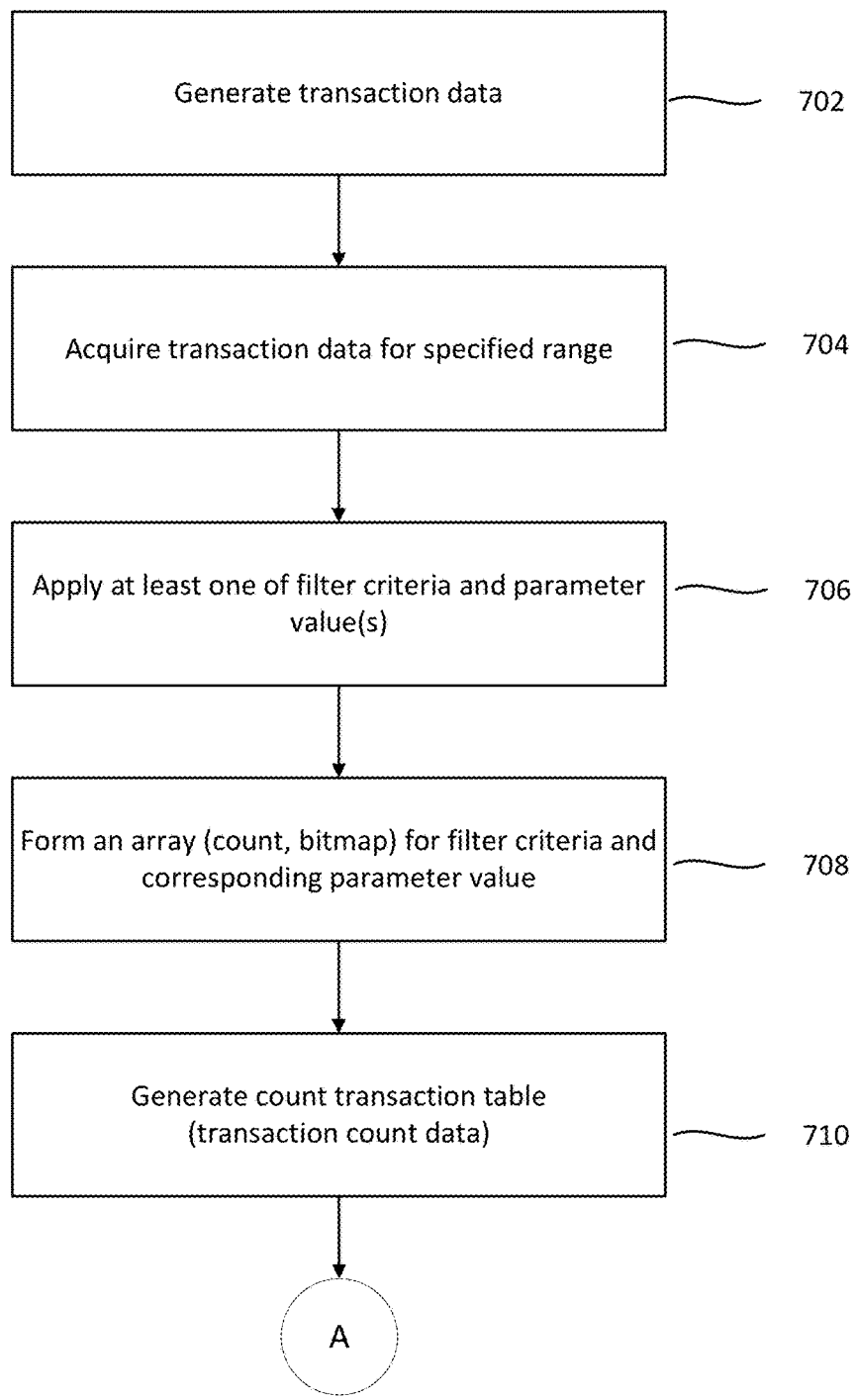

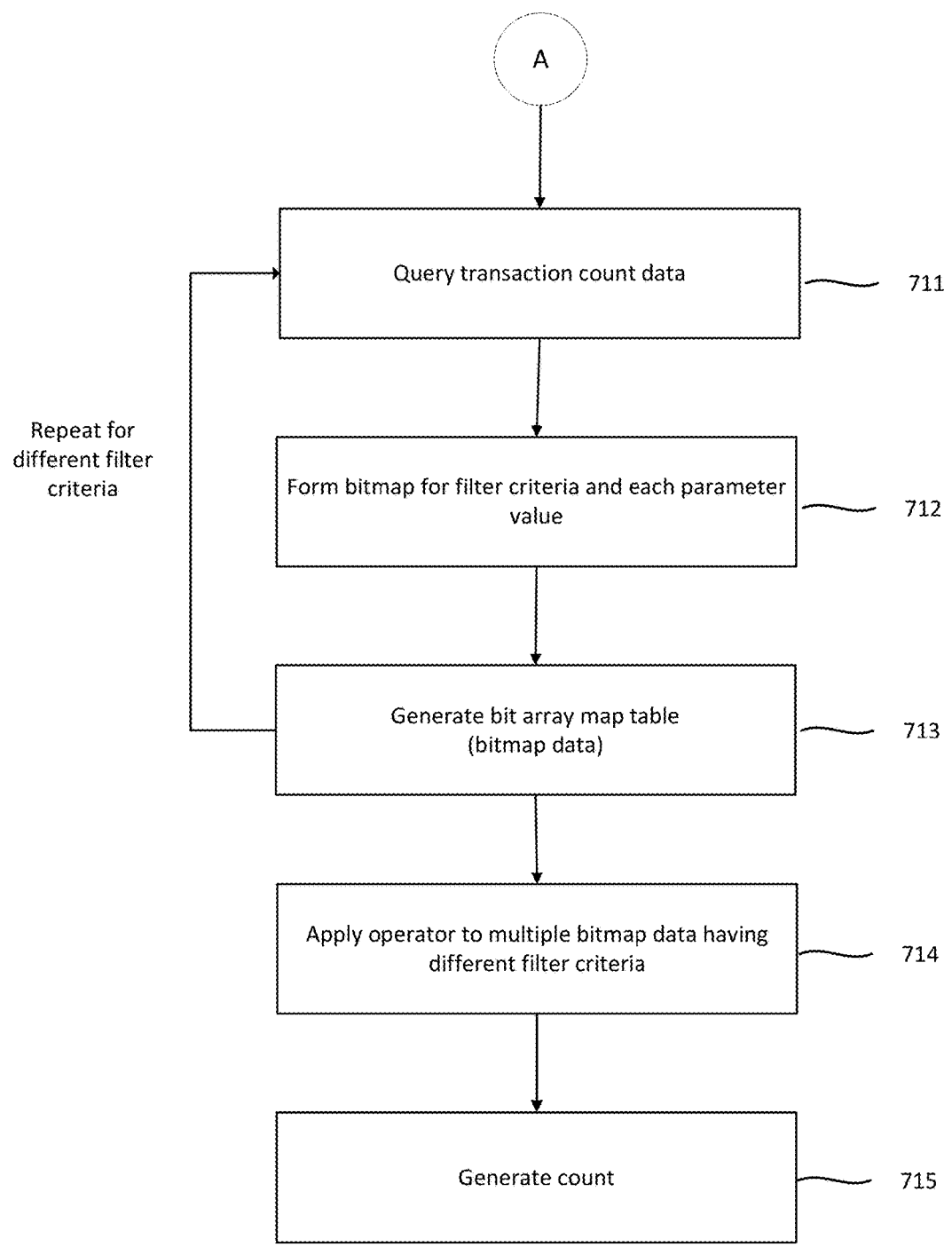

Fig. 9

TS_TIMESTAMP : TS_PERIOD : PARAM_NAME : COUNTER_SHARD

454352345 : 15 : ERROR: 1

Fig. 10

| Number of bits | Sparcity (total bits 'on' in a 32 bit fragment) and half of the bit-array is filled with this sparcity | Random (bits are set randomly) | Total bits 'on' | Size of the bit-array (in bytes) | "And" cardinality response time on compressed bitsets (ms) | "Or" cardinality response time on compressed bitsets (ms) |
|---|---|---|---|---|---|---|
| 1000000 | 4 | true | 55449 | 59232 | 5 | 2 |
| 100000 | 4 | true | 5524 | 5844 | 4 | 0 |
| 10000 | 4 | true | 543 | 691 | 3 | 0 |
| 1000000 | 4 | false | 62501 | 62913 | 4 | 0 |
| 100000 | 4 | false | 6253 | 6380 | 3 | 0 |
| 10000 | 4 | false | 620 | 739 | 3 | 0 |
| 1000000 | 24 | true | 214185 | 62183 | 4 | 1 |
| 100000 | 24 | true | 21460 | 6279 | 4 | 0 |
| 10000 | 24 | true | 2144 | 723 | 3 | 0 |

SYSTEM AND METHOD TO GENERATE A TRANSACTION COUNT USING FILTERING

BACKGROUND

As the Internet's popularity grows, more businesses are establishing a presence on the Internet. These businesses typically set up web sites that run one or more web applications. Customers browse businesses web sites for numerous reasons. However, the browsing of online consumer retail stores has grown exponentially over the past few years without any stop in sight. With the continued growth, the number of customers and sales increases along with the amount of data associated with such sales. One type of data associated with customer sales is transaction data. One disadvantage of doing business online is that if the web site goes down, becomes unresponsive or otherwise is not properly serving customers, the business is losing potential sales and/or customers. Often times, a web site's unresponsiveness occurs during the transaction between the customer and the business associated with the online web site, resulting is customer dissatisfaction. Similar issues exist with Intranets and Extranets. Thus, there is a need to monitor live web applications and web sites to make sure that they are running properly.

One particular scenario that web application developers seek to avoid is a task that runs too slowly. For example, it may be expected that a task will take a fraction of one second to complete its functions; however, due to something going wrong, the task executes for thirty seconds. A task running too slowly can degrade performance of a web site, degrade performance of a web application, and cause an application to fail, or cause a web site to fail. Thus, there is a need to avoid poorly performing tasks.

When an application is performing poorly, the developer or administrator usually attempts to debug the software to figure out which code is causing the performance issues so that code can be fixed. While it is usually easy to detect when an application is performing poorly because the response time is noticeably slower, it is often very difficult to determine which portion of the software is responsible for the poor performance. Even if the developer can determine which method, function, routine, process, etc. the application was performing when the issues occurred, it is not clear whether the problem was because of that method, function, routine, process, etc. or another method, function, routine, process, etc. called by that method, function, routine, process, etc.

Thus, there is a need to improve the ability to determine which portion of the software is responsible for an application performing poorly.

BRIEF SUMMARY

The present disclosure, generally described, relates to technology for monitoring web-based applications across network environments to ensure reliability. Web-based applications are increasingly relied on by businesses to perform functions and continuously monitor transactions to provide transaction visibility. As businesses increasingly utilize this technology, the amount of transaction data generated becomes increasingly complex to monitor. To monitor increasingly large amounts of transaction data, the present disclosure analyzes the transaction data by applying filtering criteria to generate a transaction count.

More specifically, the present disclosure generates transaction data that has been acquired from a set of transactions occurring in the network environment. The transaction data is filtered against a set of criteria to generate a subset of the transaction data, the subset of data including transaction data satisfying the filter criteria. The transactions are then arranged into transaction count data and bitmap data (i.e., data packs) in a format enabling efficient count generation. The count generation indicates how many transactions meet the applied filter criteria, as well as identify problematic transactions, such as transactions with errors or stalls. The data may then be efficiently stored in a database.

In one embodiment, and after transaction data is generated from the set of transactions, the transaction data is narrowed and extracted to form transaction data for which transactions have occurred during a specified range. A filter criteria and parameter values are selected and applied to the extracted transaction data to generate an array [count, {bitmap}] for each parameter value corresponding to the filter criteria. The array provides a "count" indicating the number of transactions matching the filter criteria and parameter values, and a "bitmap" indicating whether each transaction in the array meets the applied filter criteria and parameter values. The filter criteria, parameter values and array are used to generate transaction count data, such as a count transaction table, which may be queried to determine a final transaction count meeting the filter criteria.

When multiple (and different) filter criteria are applied to transaction data, separate bitmap data, such as a bit array map table, is formed for each of the different filter criteria. The generated bitmap data may then be compared using an operator (such as a logical operator) to determine whether the multiple filter criteria have been satisfied for the combination of bitmap data. For example, an operational function, such as AND, OR, GREATER THAN, etc. may be used. Subsequently, the data may be queried to determine the final transaction count meeting the multiple filter criteria.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Aspects of the present disclosure are illustrated by way of example and are not limited by the accompanying FIGS. with like references indicating like elements.

FIG. 4 is an exemplary flow chart describing one embodiment of a process for starting the tracing of a transaction.

FIG. 5 is an exemplary flow chart describing one embodiment of a process for concluding the tracing of a transaction.

FIG. 6A discloses one embodiment of transaction data processed using the system of FIG. 1.

FIG. 6D discloses another embodiment of transaction data processed using the system of FIG. 1.

FIG. 6E discloses another embodiment of transaction data processed using the system of FIG. 1.

FIG. 7A discloses one embodiment of bitmap data processed using the system of FIG. 1.

FIG. 7B discloses another embodiment bitmap data processed using the system of FIG. 1.

FIG. 7C discloses one embodiment of a flowchart of generating transaction count data using the transaction data of FIG. 6A.

FIG. 7D discloses one embodiment of a flowchart of generating a transaction count for the bitmap data of FIGS. 7A and 7B.

FIG. 9 illustrates one embodiment of a format of transaction data using parameters.

FIG. 10 discloses one embodiment of an exemplary table of performance results illustrating storage efficiency.

DETAILED DESCRIPTION

Figure 1:
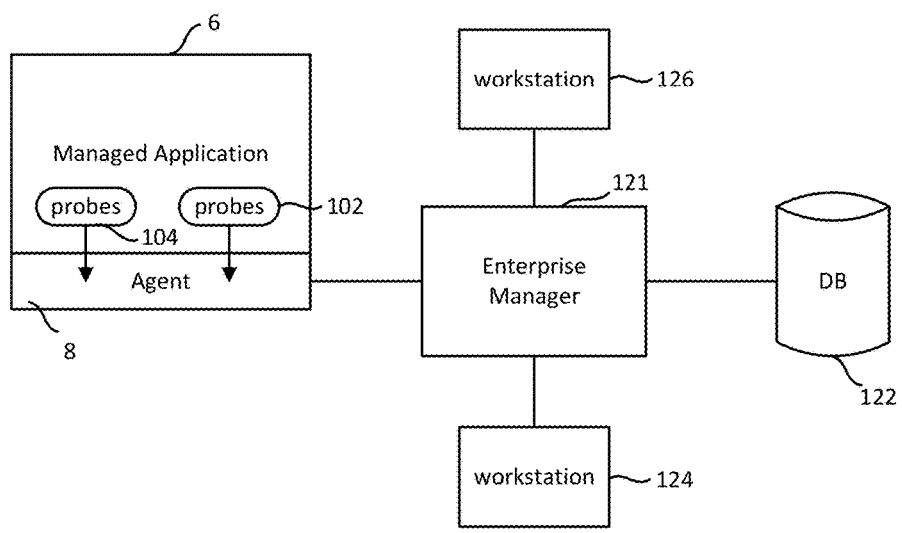
FIG. 1 is an exemplary block diagram of a system for monitoring an application.

In view of the foregoing, the present disclosure, through one or more of its various aspects, embodiments and/or specific features or sub-components, is thus intended to bring out one or more of the advantages as specifically noted below.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or by combining software and hardware implementations that may all generally be referred to herein as a "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The present disclosure is directed to a system and method of monitoring transactions occurring over a network using a web-based application. Specifically, the web-based application monitors transactions that occur, for example, when customers transact online using a business web site. The transactions are counted to identify which of the transactions meet a specific filtering criteria. The filtering criteria enables the monitoring to triage the transactions such that they are organized in a manner for efficient querying and storage. In one embodiment, the system counts transactions in order to identify those transactions that have a duration time greater than a threshold time. A transaction is a method, process, procedure, function, thread, set of instructions, etc. for performing a task. In one embodiment, the present disclosure is used to monitor methods in a Java environment. However, other environments also apply. In that embodiment, a transaction is a method invocation in a running software system that enters the Java Virtual Machine ("JVM") and exits the JVM (and all that it calls). In one embodiment, the system described below can initiate transaction tracing on one, some, or all transactions managed by the system. A user, or another entity, can specify a threshold trace period. All transactions whose duration exceeds the threshold trace period are counted. In one embodiment, the reporting will be performed by a Graphical User Interface ("GUI") that lists all transactions exceeding the specified threshold. Although the implementation described below is based on a Java application, the present disclosure can be used with other programming languages, paradigms and/or environments.

There are many ways to implement the present disclosure. One example is to implement the present disclosure within an application performance management tool. One embodiment of such an application performance management tool monitors performance of an application by having access to the source code and modifying that source code. Sometimes, however, the source code is not available. Another type of tool performs application performance management without requiring access to or modification of the application's source code. Rather, the tool instruments the application's object code (also called bytecode).

FIG. 1 is a conceptual view of the components of the application performance management tool. In addition to managed application 6 with probes 102 and 104, FIG. 1 also depicts Enterprise Manager 121, database 122, workstation 124 and workstation 126. As a managed application 6 runs, probes (e.g. 102 and/or 104) relay data to Agent 8. Agent 8 then collects and summarizes the data, and sends it to Enterprise Manager 121. Enterprise Manager 121 receives performance data from managed applications 6 via Agent 8, runs requested calculations, makes performance data available to workstations (e.g. 124 and 126) and optionally sends performance data to database 122 for later analysis.

In one embodiment of the system of FIG. 1, each of the components are running on different machines. That is, workstation 126 is on a first computing device, workstation 124 is on a second computing device, Enterprise Manager 121 is on a third computing device, and managed Application 6 is running on a fourth computing device. In another embodiment, two or more (or all) of the components are operating on the same computing device. For example, managed application 6 and Agent 8 may be on a first computing device, Enterprise Manager 121 on a second computing device and a workstation on a third computing device. Alternatively, all of the components of FIG. 1 can run on the same computing device. Any or all of these computing devices can be any of various different types of computing devices, including the structures depicted and described with respect to FIG. 2, below.

In some embodiments, a user of the system in FIG. 1 can initiate transaction tracing on all or some of the Agents managed by an Enterprise Manager by specifying a threshold trace period. All transactions inside an Agent whose execution time exceeds this threshold level will be traced and reported to the Enterprise Manager 121, which will route the information to the appropriate workstations who have registered interest in the trace information.

Figure 2:
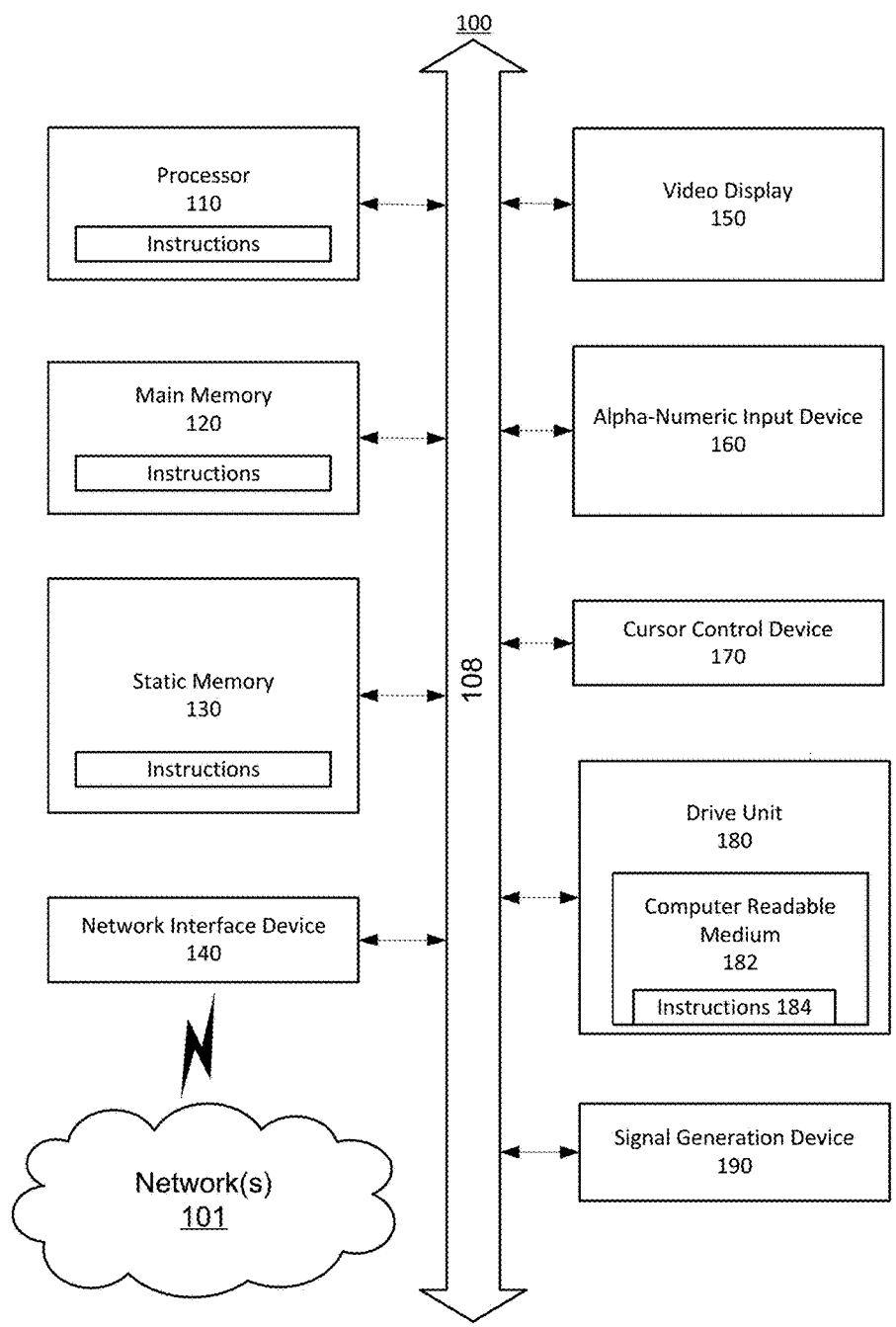
FIG. 2 shows an exemplary general computer system that includes a set of instructions for active records for interactive systems.

FIG. 2 is an illustrative embodiment of a general computer system. The general computer system which is shown and is designated 100 may be used to implement the device illustrated in FIG. 1. The computer system 100 can include a set of instructions that can be executed to cause the computer system 100 to perform any one or more of the methods or computer based functions disclosed herein. The computer system 100 may operate as a standalone device or may be connected, for example, using a network 101, to other computer systems or peripheral devices.

In a networked deployment, the computer system 100 may operate in the capacity of a server or as a client user computer in a server-client user network environment, or as a peer computer system in a peer-to-peer (or distributed) network environment. The computer system 100 can also be implemented as or incorporated into various devices, such as an call interceptor, an IVR, a context manager, an enrichment sub-system, a message generator, a message distributor, a rule engine, an IVR server, an interface server, a record generator, a data interface, a filter/enhancer, a script engine, a PBX, stationary computer, a mobile computer, a personal computer (PC), a laptop computer, a tablet computer, a wireless smart phone, a personal digital assistant (PDA), a global positioning satellite (GPS) device, a communication device, a control system, a web appliance, a network router, switch or bridge, a web server, or any other machine capable of executing a set of instructions (sequential or otherwise) that specify actions to be taken by that machine. The computer system 100 can be incorporated as or in a particular device that in turn is in an integrated system that includes additional devices. In a particular embodiment, the computer system 100 can be implemented using electronic devices that provide voice, video or data communication. Further, while a single computer system 100 is illustrated, the term "system" shall also be taken to include any collection of systems or sub-systems that individually or jointly execute a set, or multiple sets, of instructions to perform one or more computer functions.

As illustrated in FIG. 2, the computer system 100 includes a processor 110. A processor for a computer system 100 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. A processor is an article of manufacture and/or a machine component. A processor for a computer system 100 is configured to execute software instructions in order to perform functions as described in the various embodiments herein. A processor for a computer system 100 may be a general purpose processor or may be part of an application specific integrated circuit (ASIC). A processor for a computer system 100 may also be a microprocessor, a microcomputer, a processor chip, a controller, a microcontroller, a digital signal processor (DSP), a state machine, or a programmable logic device. A processor for a computer system 100 may also be a logical circuit, including a programmable gate array (PGA) such as a field programmable gate array (FPGA), or another type of circuit that includes discrete gate and/or transistor logic. A processor for a computer system 100 may be a central processing unit (CPU), a graphics processing unit (GPU), or both. Additionally, any processor described herein may include multiple processors, parallel processors, or both. Multiple processors may be included in, or coupled to, a single device or multiple devices.

Moreover, the computer system 100 includes a main memory 120 and a static memory 130 that can communicate with each, and processor 110, other via a bus 108. Memories described herein are tangible storage mediums that can store data and executable instructions, and are non-transitory during the time instructions are stored therein. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. A memory describe herein is an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted.

As shown, the computer system 100 may further include a video display unit 150, such as a liquid crystal display (LCD), an organic light emitting diode (OLED), a flat panel display, a solid state display, or a cathode ray tube (CRT). Additionally, the computer system 100 may include an input device 160, such as a keyboard/virtual keyboard or touch-sensitive input screen or speech input with speech recognition, and a cursor control device 170, such as a mouse or touch-sensitive input screen or pad. The computer system 100 can also include a disk drive unit 180, a signal generation device 190, such as a speaker or remote control, and a network interface device 140.

In a particular embodiment, as depicted in FIG. 2, the disk drive unit 180 may include a computer-readable medium 182 in which one or more sets of instructions 184, e.g. software, can be embedded. Sets of instructions 184 can be read from the computer-readable medium 182. Further, the instructions 184, when executed by a processor, can be used to perform one or more of the methods and processes as described herein. In a particular embodiment, the instructions 184 may reside completely, or at least partially, within the main memory 120, the static memory 130, and/or within the processor 110 during execution by the computer system 100.

In an alternative embodiment, dedicated hardware implementations, such as application-specific integrated circuits (ASICs), programmable logic arrays and other hardware components, can be constructed to implement one or more of the methods described herein. One or more embodiments described herein may implement functions using two or more specific interconnected hardware modules or devices with related control and data signals that can be communicated between and through the modules. Accordingly, the present disclosure encompasses software, firmware, and hardware implementations. Nothing in the present application should be interpreted as being implemented or implementable solely with software and not hardware such as a tangible non-transitory processor and/or memory.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

Figure 3:
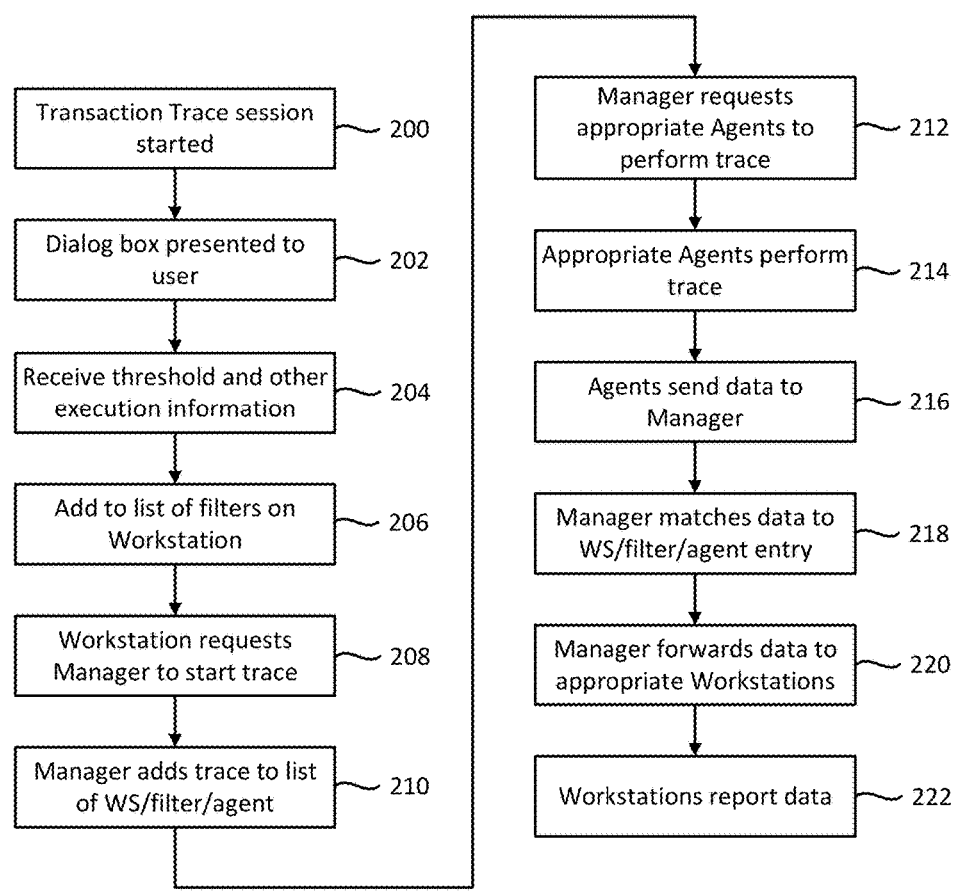
FIG. 3 is an exemplary flow chart describing one embodiment of a process for tracing transactions using the system of FIG. 1.

FIG. 3 is a flowchart describing one embodiment of a process for tracing transactions using the system of FIG. 1. In 200, a transaction trace session is started. In one embodiment of 200, a window is opened and a user will select a dropdown menu to start a transaction trace session. In other embodiments, other methods can be used to start the session. In 202, a dialog box is presented to the user. This dialog box will ask the user for various configuration information. In 204, the various configuration information is provided by the user by typing information into the dialogue box. Other means for entering the information can also be used within the spirit of the present disclosure. One variable entered by the user in 204 is the threshold trace period. That is, the user enters a time, which could be in seconds, milliseconds, microseconds, etc. The system reports those transactions that have a duration longer than the threshold period provided. For example, if the threshold is one second, the system will only report transactions that are executing for longer than one second. In some embodiments, 204 only includes providing a threshold time period. In other embodiments, other configuration data can also be provided. Another configuration variable that can be provided is the session length. The session length indicates how long the system will perform the tracing. For example, if the session length is ten minutes, the system will only trace transactions for ten minutes. At the end of the ten minute period, new transactions that are started will not be traced; however, transactions that have already started during the ten minute period will continue to be traced. In other embodiments, at the end of the session length all tracing will cease regardless of when the transaction started. Other configuration data can also include specifying one or more user IDs, a flag set by an external process or other data of interest to the user. For example, the user ID is used to specify that the only transactions initiated by processes associated with a particular one, or more user IDs will be traced. The flag is used so that an external process can set a flag for certain transactions, and only those transactions that have the flag set will be traced. Other parameters can also be used to identify which transactions to trace. The information provided in 202 is used to create a filter.

In 206 of FIG. 3, the workstation adds the new filter to a list of filters on the workstation. In 208, the workstation requests Enterprise Manager 121 to start the trace using the new filter. In 210, Enterprise Manager 121 adds the filter received from the workstation to a list of filters. For each filter in its list, Enterprise Manager 121 stores an identification of the workstation that requested the filter, the details of the filter (described above). In 212, Enterprise Manager 121 requests the appropriate Agents to perform the trace. In 214, the appropriate Agents perform the trace. In 216, the Agents performing the trace send data to Enterprise Manager 121. In 218, Enterprise Manager 121 matches the received data to the appropriate workstation/filter/Agent entry. In 220, Enterprise Manager 121 forwards the data to the appropriate workstation(s) based on the matching in 218. In 222, the appropriate workstations report the data. In one embodiment, the workstation can report the data by writing information to a text file, to a relational database, or other data container. In another embodiment, a workstation can report the data by displaying the data in a GUI.

FIG. 4 is a flowchart describing one embodiment of a process for starting the tracing of a transaction. The process of FIG. 4 is performed by the appropriate Agent(s). In 302, a transaction starts. In 304, the Agent acquires the desired parameter information. Numerous and different parameters can be stored. In one embodiment, the actual list of parameters used is dependent on the application being monitored. The present disclosure is not limited to any particular set of parameters. In 306, the system acquires a timestamp indicating the current time. In 308, a stack entry is created, and in 310, the stack entry is pushed. In one embodiment, the timestamp is added as part of 310. The process of FIG. 4 is performed when a transaction is started. A process similar to that of FIG. 4 is performed when a sub-component of the transaction starts.

FIG. 5 is a flowchart describing one embodiment of a process for concluding the tracing of a transaction. The process of FIG. 5 is performed by an Agent when a transaction ends. In 340, the process is triggered by a transaction (e.g. method) ending as described above (e.g. calling of the method "finishTrace"). In 342, the system acquires the current time. In 344, the stack entry is removed, and in 346, the duration of the transaction is calculated by comparing the timestamp from 342 to the timestamp stored in the stack entry. In 348, the filter for the trace is applied. For example, the filter may include a threshold period of one second. Thus, in 348, it is determined whether the calculated duration from 346 is greater than one second. If the threshold is not exceeded (350), then the data for the transaction is discarded. In one embodiment, the entire stack entry is discarded. In another embodiment, only the parameters and timestamps are discarded. In other embodiments, various subsets of data can be discarded. In some embodiments, if the threshold period is not exceeded then the data is not transmitted by the Agent to other components in the system of FIG. 1. If the duration exceeds the threshold (350), then the Agent builds component data at 360. Component data is the data about transaction that will be reported, also referred to as transaction data in this disclosure. In one embodiment, the component data includes the name of the transaction, the type of the transaction, the start time of the transaction, the duration of the transaction, a hash map of the parameters, and all of the sub-elements (which can be a recursive list of elements). Other information can also be part of the component data. In 362, the Agent reports the component data by sending the component data via the TCP/IP protocol to Enterprise Manager 121. FIG. 5 represents what happens when a transaction finishes. When a sub-component finishes, however, the process includes getting a time stamp, removing the stack entry for the sub-component and adding the completed sub-element to previous stack entry. In one embodiment, the filters and decision logic are applied to the start and end of the transaction, rather than to a specific sub-component.

FIG. 6A discloses one embodiment of transaction data processed using the system of FIG. 1. Transaction count table (transaction count data) 600 depicts transaction data in a table format that has been captured using, for example, the system and methods described above with respect to FIGS. 3, 4 and 5. More specifically, transaction count table 600 represents exemplary transaction count data in the form of a data pack that has been generated using the transaction data previously collected and processed as a result of the transaction trace using Agent 8, Enterprise Manager 121 and/or workstations 124, 126, which data may also be stored in the database 122 (illustrated in FIGS. 3, 4 and 5). A data pack generally refers to the information stored in a transaction count table, such as transaction count table 600. Each transaction count data includes transaction data generated for a range (e.g., a specified time period), which may be fixed or otherwise. For example, the transaction count data may include transaction data collected and generated in 1 second, 15 minutes, 1 hour, 1 day or any possible range. Thus, for example, a transaction trace having a range of 1 second may result in a total of 10 transactions occurring during that time period. It is appreciated that ranges are not limited to a time period, but may include any range that is appropriate to achieve efficient count retrieval. Thus, for example, the transaction count data packaged into a one day range may allow for calculation of a count quicker than going through multiple one minute range transaction count data.

In the exemplary table of FIG. 6A, the transaction data has been collected and processed from an original data set as a result of the transaction trace, as explained above with reference to FIGS. 3, 4 and 5. The transaction data (depicted as the transaction count data in transaction count table 600) is analyzed using filter criteria and/or parameter values such that the transaction count data in transaction count table 600 represents transaction data meeting the specified filter criteria or parameter values established by the system depicted in FIG. 1, including any component of the system such as workstations 124, 126 of the system (as further described below). That is, in this exemplary embodiment, the transaction count data includes transaction data for the range (e.g., a specified time period). In other words, the transaction count data is created from the transaction data, where each transaction has a parameter "duration" and corresponding "value." This transaction count data is analyzed based on the filter criteria (e.g., duration, error, etc.) having a parameter value or range of values, where a value in the range may be, for example, 27 ms, 45 ms and 56 ms). In the illustrated embodiment, the transaction count data is shown as parameter values ("key" or filter criteria) and a count and bitmap array ("Value ([count, bitmap])") for the transactions occurring in the specified time range. That is, for each parameter value in the first column of the table (e.g., 27 ms, 45, ms, etc.), a corresponding count and bitmap array is generated in a second column based on a transaction satisfying the filter criteria (e.g., the transaction has a duration of 27 ms). For example, an array in the first row of table 600 is formed for a duration of 27 ms and has a corresponding Value ([count, bitmap]) of [2, {1,0,0,0,1,0,0,0,0,0}]. Additionally, a third column is illustrated in which a description of the row is provided, although it is appreciated that the third column is not necessary for data extraction. Examples of filter criteria used to analyze the transaction data include (but not form the transaction data), but are not limited to, error count, transaction name, duration, stall count, session length, user ID, flags, etc. The filter criteria may also include a range of values, such as a time duration, or a unique value, such as a report or state (examples of which follow). Examples of a parameter values include a numeric or alpha-numeric value, range of values or a unique value or identifier that corresponds to the filter criteria. For example, if the filter criteria is "duration", a corresponding parameter value may be "27 milliseconds". The filter criteria and parameter value may be predetermined and/or set during the process in which the transaction data are generated. Thus, for a duration of 27 milliseconds, a corresponding count and bitmap array is generated. For example, in the second column of the transaction count table 600, the array corresponding to 27 milliseconds is [2, {1,0,0,0,1,0,0,0,0,0}]. The count (in this example, 2) represents the number of transactions in which the filter criteria (e.g., duration) is less than or equal (<=) to the parameter value (e.g., 27 ms). For example, transactions occurring during the specified time range and identified as having a duration of 27 seconds or less are shown as {1,0,0,0,1,0,0,0,0,0}. Here, each bit in the bitmap corresponds to a single transaction of all transactions (10 in this example), and identifies whether any one transaction meets the filter criteria and parameter value (where a "1" indicates the transaction satisfies the filter criteria and parameter value, and a "0" indicates it does not).

In one embodiment, array entries in the transaction count table 600 are an aggregation of the arrays generated in a prior row. For example, the count for the second row of the second column is 6, which is an aggregation of 4 transactions satisfying the filter criteria for parameter value 45 and 2 transactions satisfying the filter criteria for parameter value 27. The third column, as illustrated, provides a description for explanatory purposes and may be removed from the transaction count table 600. It is appreciated that selection of the duration equal to 50 and being less than or equal to the parameter value is a non-limiting example, and that any value may be selected along with any single or combination of operators (e.g., equal, greater than, less than, greater than or equal, less than or equal, and, or, not, etc. For example, the filter criteria may include multiple criteria combined with "AND" or "OR" operators, such as "find count of transactions having a duration >50 AND an error >2 for a range including the next 2 hours." Moreover, the transaction count table 600 may be stored, for example, in database 122.

Figure 6B:
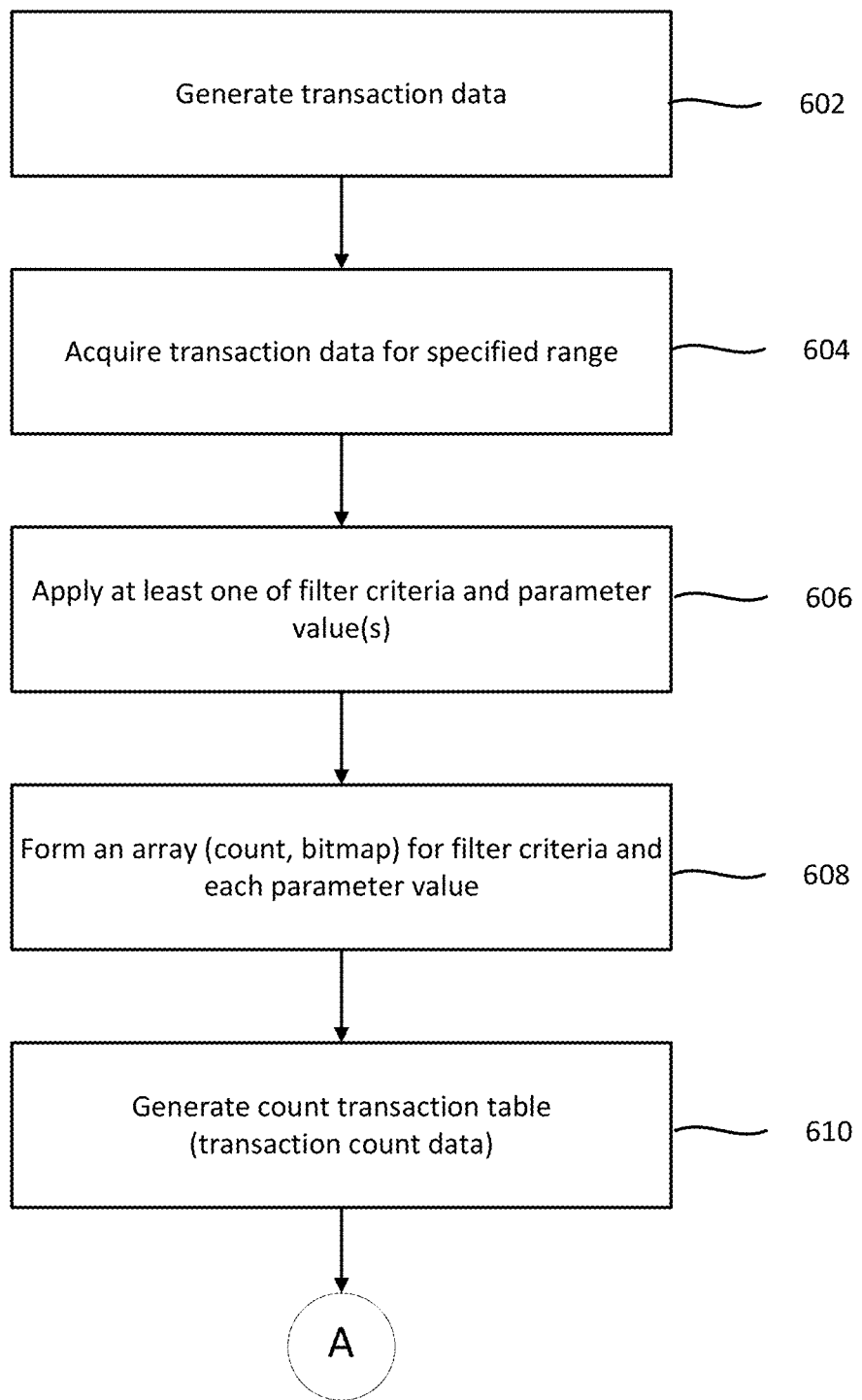
FIG. 6B discloses one embodiment of a flowchart for generating a transaction count data for the transaction data of FIG. 6A.

FIG. 6B discloses one embodiment of a flowchart for generating transaction count data, such as the transaction count table 600 of FIG. 6A. The process of FIG. 6B is performed using the system illustrated in FIG. 1, and for example, by Agent 8. Transaction data is initially generated at 602 using the transaction trace process described above with reference to FIGS. 3, 4 and 5. Once the transaction data has been generated at 602, the transaction data for a specified range is acquired at 604. As explained above, the transaction data is extracted for a specified time range such that only transactions occurring during the range are further analyzed. For example, the range may be specified as any transaction made during a specified five minute period. At 606, at least one of filter criteria and parameter values provided or selected via the system illustrated in FIG. 1, using for example the workstations 124, 126, are applied to the extracted transaction data acquired at 604 to form an array. As described above, transaction data in the specified range is analyzed to determine whether the filter criteria and parameter values have been satisfied. That is, transaction data for the specified time range is analyzed based on the filter criteria and parameter values to generate or form a corresponding array. For example, and with reference to FIG. 6A, if any transaction in the transaction data of the first five minutes has a duration (filter criteria) of 56 milliseconds (parameter value) or less, then the filter criteria and parameter value has been satisfied and the transaction is "marked" to form the array (described below in more detail). Using the results for each parameter value, an array ([count, {bitmap}]) is formed for the filter criteria and each parameter value at 608. As an example, and for a filter criteria that is a duration and a parameter value that has a duration of 56 milliseconds, an array is generated including a count of 9 and bitmap of {1,1,1,0,1,1,1,1,1,1}. Accordingly, applying the filter criteria and parameter value to generate an array, there are 9 transactions (9 bits having a "1") that satisfy filtering. Using this process, the transaction count table 600 storing the transaction count data (including the arrays) illustrated in FIG. 6A is generated at 610. In one embodiment, the transaction count table 600 is implemented using the Java™ NavigableMap interface, which permits the discovery of entries in the transaction count table 600 having a parameter value that is least nearest, but may be the same, to a selected value used as the searching criteria. For example, if a selected value of 35 ms is selected, the least nearest parameter value to the selected value is a parameter value of 27 ms, which has a count of 2. In another embodiment, each array in the transaction count table 600 is an aggregation of the prior array entries, where each array is sorted in an order from least to greatest parameter value. For example, for the parameter value of 1001, the array has a count value of 10 and a bitmap of {1,1,1,1,1,1,1,1,1,1}, where the parameter value of 1001 is the greatest numeric value. Here, the array corresponding to parameter value 101 is an aggregation of the prior count 9 and the bitmap {1,1,1,0,1,1,1,1,1,1}. That is, a count of 9 plus a count of 1 equals an aggregated count of 10 and a bitmap of {1,1,1,1, 1,1,1,1,1,1}. It is appreciated that the transaction count table may be navigated using other methods as well known in the art, and is not limited to the Java™ NavigableMap interface.

Figure 6C:
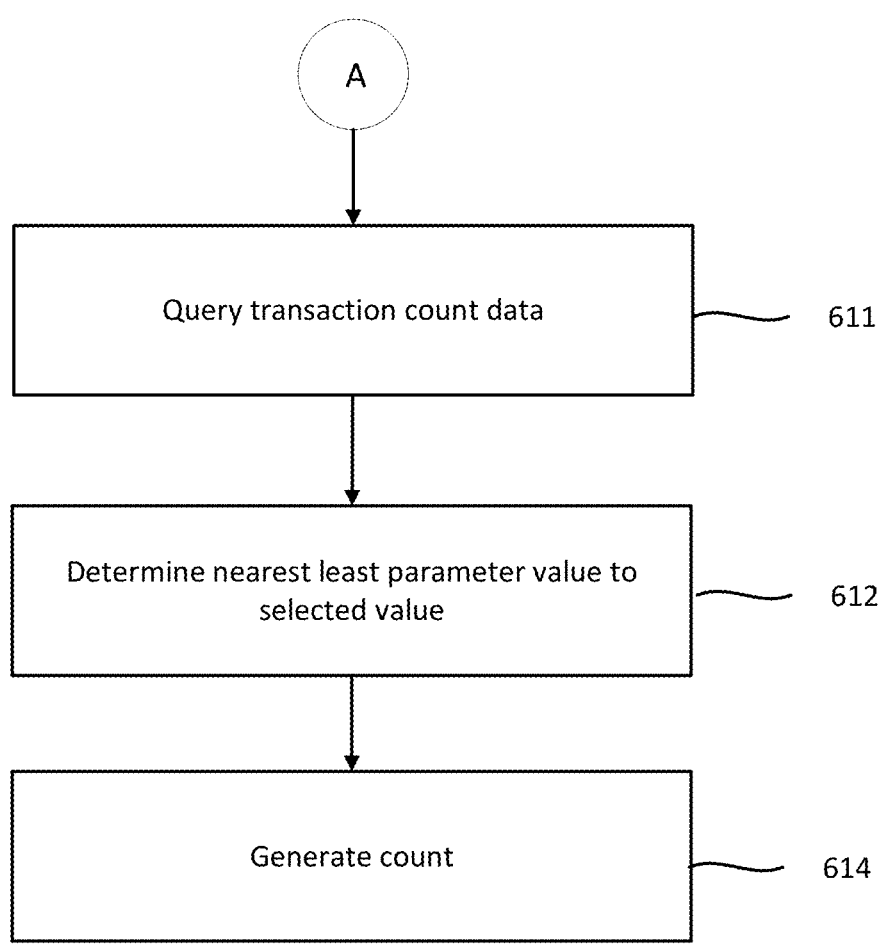
FIG. 6C discloses one embodiment of a flowchart for generating a transaction count for the transaction count data of FIG. 6B.

In one exemplary embodiment, the transaction count table 600 of FIG. 6A is generated as follows. In the exemplary embodiment, filter criteria is set as a duration with a selected value in which the duration has a parameter value >50 ms (i.e., the parameter value has a selected value of greater than 50 ms). Using the NavigableMap search function of the NavigableMap interface, the transaction data in the specified range is searched to find transactions having a parameter value >50 ms. In this example, the parameter value 50 ms does not exist in the transaction count table 600. Accordingly, the nearest least parameter value of 45 ms is selected. It is appreciated that selection of the nearest least value is non-limiting, and that other methods may be used. For example, the nearest greatest value could be used as the selection, or the actual value could be used as the selection. To generate a transaction count for the transaction count table 600 having the parameter value >50 ms, the count of parameter value 45 ms (count=6) is subtracted from the count of parameter value 1001 (count=10, and is the last entry in the table). Thus, the count for transactions in transaction count table 600 having a parameter value >50 ms is equal to 4 (10 subtracted by 6). Here, the count also equals the number of transactions in the bitmap of the array satisfying the filter criteria and a corresponding one of the parameter values in the transaction count table 600. This is illustrated for example in FIG. 6C, which discloses one embodiment of a flowchart for generating a transaction count for the transaction count data of FIG. 6B. In particular, the transaction count data in the transaction count table) 600 is queried at 611 using a selected value (e.g., greater than 50 ms) as the parameter value. Next, the nearest least value of the parameter values to the selected value is determined (e.g., a parameter value=45 ms is the nearest least parameter value compared to the selected value of greater than 50 ms) at 612. A transaction count value (i.e., the total number of transactions that satisfies the filter criteria using the selected value) is generated at 614. In this example, there are 4 transactions that satisfy the filter criteria using the selected value. Thus, a total transaction count equals 4.

While the embodiment discloses a parameter value >50 ms, the duration may also have a parameter value >, <, >=, <=, = or does not=any value or range of values. The values may be a default value, a predefined value or any user specified value or range of values, as appreciated by the skilled artisan. For example, for a count of 8, if an error >=2, the count from the last key is retrieved, the nearest key <2 is retrieved, and the count for the previous key is retrieved.

To calculate the final count, you subtract the current count minus the last count. In another example, if the error<4, the nearest key<4 is retrieved and the count for the previous key is retrieved. In still another example, if the error <=4, the count from the map where key is 4 is retrieved. And, when error=4, the count where the key is 4 is retrieved, the nearest key<4 is retrieved and the count for the previous key is retrieved. To calculate the final count, the previous count is subtracted from the current count. Finally, to retrieve all errors, the count from the last key is retrieved. In another example, while applying these filters on bit map data apart from counts, to apply filter criteria such as duration >50 on table 600, similar to process followed to calculate count from subtracting two different counts (10 subtracted by 6) as mentioned above, it will take bit array of the row having nearest value to 50, which is 45 in this case and also takes the last row's bit array. From that, it will subtract the bit array of 45 row from the last row's bit array using bit operation XOR to generate the bit array for final count. For example, last row's bit array is {1,1,1,1,1,1,1,1,1,1} and 45 key row's bit array is {1,1,1,0,1,0,1,1,0,0}. Applying bit operation XOR on these two bit arrays result into final bit array which is {0,0,0,1,0,1,0,0,1,1}. The cardinality of this final bit array is 4 which is equivalent to the count generated from above process (10 subtracted by 6) which is also 4. These final bit arrays generated for these type of filters are useful while applying logical AND, OR operations between multiple filters, such as for the combination of filters 'duration >50 AND errors >2", which is explained in later sections.

FIG. 6D discloses one embodiment of transaction data processed using the system of FIG. 1. The illustrated embodiment is similar to FIG. 6A. However, instead of the key being a single number, the key is a range of numbers. For example, the range of numbers may be the number of errors occurring in a transaction. Thus, for a range of 11-20 a total of 2 errors has occurred in the transactions T1-T10 (depicted as the array [2, {1,0,0,0,1,0,0,0,0,0} ]). The range is not limited to the depicted embodiment, and could be replaced with any variety of ranges or in terms of increments, such as increments of 10's or 100's, etc. Additionally, the table 600a could include, or as an alternative be, a parameter value that identifies transactions in a range that is not specified above a particular value. For example, for parameters having a higher range than 50, the count table may have 51 as a key. Any error that occurs in a range of <=51 would fall into the same row. A description of the table and process associated therewith will not be repeated, as it corresponds to the description of the table appearing in FIG. 6A (albeit with ranges).

In still another embodiment, FIG. 6E discloses transaction data processed using the system of FIG. 1. In the exemplary embodiment, instead of the key representing a numerical value or range, the key is designated as a unique value (or identifier), such as "STATE." For example, for a given number of transactions, the system may wish to determine which of three states (e.g., MD, CA, TX) each transaction has occurred. Thus, in the exemplary embodiment, the key may be set as state with each row in table 600b corresponding to a particular state. For example, in the row designated with the state of MD, two of the ten transactions T1-T10 has occurred therein (resulting in the array [2, {1,0,0,0,1,0,0,0, 0,0}]. It is appreciated that the depicted embodiment is not limited to states or the number of states disclosed, but that any range of keys and/or associated values may be designated. For example, a key may include a transaction name with parameter values including parties (such as buyer and seller) to the transaction. A description of the table and process associated therewith will not be repeated, as it corresponds to the description of the table appearing in FIG. 6A (albeit with a unique value).

FIG. 7A discloses one embodiment of bitmap data processed using the system of FIG. 1. Bit array map table 700 includes bitmap data (i.e., a data pack) that has been generated using the transaction data previously collected and processed as a result of the transaction trace using the system and methods described with reference to FIGS. 3, 4 and 5, including for example Agent 8, Enterprise Manager 121 and/or workstations 124, 126, which data may also be stored in the database 122. Bit array map table 700 includes transaction data generated for a range (e.g., a specified time period), which may be fixed or otherwise. The transaction data for a specified range is generated in a manner described above with respect to FIGS. 6A and 6B. For example, the bit array map table 700 may include transaction data generated for transactions that occurred in 1 second, 15 minutes, 1 hour, 1 day or any possible range. Thus, for example, a transaction trace (as described above) having a range of 1 second may result in transaction data for a total of 10 transactions. It is appreciated that ranges are not limited to a time period, but may include any range.

In the exemplary table of FIG. 7A, the transaction data has been extracted from an original data set as a result of the transaction trace described above with reference to FIGS. 3, 4 and 5. The transaction data is analyzed using filter criteria and/or parameter values such that the bitmap data in bit array map table 700 represents transaction data meeting the specified filter criteria or parameter values established by the system depicted in FIG. 1, including any component of the system such as workstations 124, 126 of the system. That is, the bitmap data includes transaction data for the range (e.g., a specified time period) having been analyzed using the filter criteria (e.g., duration or error) meeting parameter values (e.g., 27 ms, 45 ms and 56 ms) established by the system. In the illustrated embodiment, each of transactions T1-T6 are together shown as a bitmap in each row of bit array map table 700 for a filter criteria (e.g. duration) and parameter value (e.g. 27 ms), where each transaction has a bit assigned as a logical "1" (indicative of filter criteria satisfying the parameter value) or "0" (indicative of filter criteria not satisfying the parameter value).

More specifically, the bit array map table 700 illustrates each transaction bit (e.g., T1, T2 . . . TN) during a specified filter criteria (e.g., duration or error) and parameter value (e.g., 27 ms, 45 ms or 56 ms). The transaction bits for each of transactions T1-T6 (i.e., columns 2-7 in the exemplary bit array map table 700) correspond to the bit value (e.g., "1" or "0") stored in the [count, {bitmap}] column of a corresponding transaction count table 600, when the same filter criteria and parameter values are applied to the same transaction data. In the example of FIG. 7A, the filter criteria applied the transaction data in table 600 is different than the filter criteria applied to the transaction data in table 600. Accordingly, the bitmaps in table 600 do not match the bitmaps in table 700. That is, a total of 10 transactions resulted from the filter criteria and parameter value shown in table 600, whereas 6 transactions resulted from the filter criteria and parameter value shown in table 700. In the exemplary bit array map table of FIG. 7A, a "1" indicates that the filter criteria and parameter value have been satisfied and a "0" indicates that the filter criteria and parameter value have not been satisfied for an individual transaction. For example, in the bit array map table 700, transactions T1 and T4 satisfy the filter criteria="duration" and the parameter value="27 ms" (e.g., T1 has a duration of 27 ms). Similarly, transactions T2 and T5 satisfy the filter criteria="duration" and the parameter value="45 ms", and transaction T3 satisfies the filter criteria="duration" and the parameter value="56 ms".

FIG. 7B discloses another embodiment of bitmap data processed using the system of FIG. 1. The bit array map table 701 is generated in accordance with the description above as it relates to FIG. 7A, and is therefore not repeated. In this example, the bit array map table 701 illustrates a bit corresponding to a transaction (e.g., T1, T2 . . . TN) when a filter criteria (e.g., error) and parameter value (e.g., 1 or 2) is used to generate the bit array. The transaction bits for each of transactions T1-T6 (i.e., columns 2-7 in the exemplary bit array map table 701) correspond to the bit value (e.g., "1" or "0") stored in the [count, {bitmap}] column of a corresponding transaction count table, when the same filter criteria and parameter values are applied to the same transaction data. In the exemplary bit array map table of FIG. 7B, similar to the example described with respect to FIG. 7A, a "1" indicates that the filter criteria and parameter value have been satisfied and a "0" indicates that the filter criteria and parameter value have not been satisfied. For example, in the bit array map table 701, transaction T3 satisfies the filter criteria="error" and the parameter value="1" (e.g., T3 has 1 error), and transactions T2 and T5 satisfy the filter criteria="error" and the parameter value="2" (e.g. T2 and T5 have 2 errors).

The bit array map tables 700 and 701 may be stored, for example, in database 122. Moreover, the data in the bit array map table may be stored using any well-known technique, such as stored as time series data, and in compressed format using any know compression technique. It is appreciated that the described bit array map tables are non-limiting examples, and that numerous bit array map tables may be generated based on various filter criteria and parameter values. It is also appreciated that the "comment" column is not required in the table.

FIG. 7C discloses one embodiment of a flowchart of generating transaction count data using the system of FIG. 1. FIG. 7C is an exemplary flowchart of creating a bit array map table 700 and 701 according to one exemplary embodiment of the disclosure. The flowchart described a process that is particularly useful when applying a logical operator (such as "AND" or "OR") to more than one set of data, as will be described further below. The process described with generating the tables in FIGS. 6A and 6B is performed by the system and method represented by FIG. 1, using for example Agent 8 or any component therein. The process for generating transaction data, acquiring transaction data for a specified range, applying filter criteria and parameter values, forming an array and generating transaction count data follows the process described above with respect to FIG. 6B, and will not be explained in detail. Transaction data is initially generated at 702 using the transaction trace process described above with reference to FIGS. 3, 4 and 5. The generated transaction data may or may not be the same as that generated in the examples above. Once the transaction data has been generated at 702, the transaction data for a specified range is acquired at 704. For example, the range may be specified as any transaction made during a specified five minute period, such that only transactions occurring during the first five minutes is acquired. At 706, at least one of filter criteria and parameter values provided or selected by the system, for example by workstations 124, 126 depicted in FIG. 1, are applied to the extracted transaction data acquired at 704. As described above, transaction data in the specified range is analyzed to determine whether the filter criteria and parameter values have been satisfied. For example, and with reference to FIGS. 7A and 7B, if any transaction in the transaction data of the first five minutes has a duration (filter criteria) of 56 milliseconds (parameter value) or less, then the filter criteria and parameter value have been satisfied and the transaction is marked with a "1". If the filter criteria and parameter value are not satisfied, then the transaction is marked with a "0". In this case, marking a transaction refers to providing a "1" or "0" in a corresponding bit of a bitmap in the bit array map table of FIGS. 7A and 7B. Next, a [count, {bitmap}] for each filter criteria and corresponding parameter value is generated at 708. As described above, and for a filter criteria="duration" and parameter value="27 ms", an array for transactions T1-T6 is respectively generated as [2, {1,0,0,1,0,0}]. The array indicates that 2 transactions (transactions T1 and T4) satisfy the filter criteria and parameter value. Using this process, the bit array map table (bitmap data) 700 illustrated in FIG. 7A is generated at 710. This process equally applies for generation of the bit array map table (bitmap data) 701 illustrated in FIG. 7B.

FIG. 7D discloses one embodiment of a flowchart of generating a transaction count for the bitmap data of FIGS. 7A and 7B. After generation of the transaction count data at 710, the data is queried using the selected value as the parameter value for a specified filter criteria at 711. It is appreciated that generation of the transaction table, such as transaction count table 600 depicted in FIG. 6A, is not necessary to complete the process, but that the transaction count data alone, formed at 708, may be used. From the queried transaction data, a bitmap including each transaction associated with the same filter criteria at a corresponding one of the parameter values is formed at 712. For example, a bitmap of {1,0,0,1,0,0} is formed in table 700 at corresponding parameter value 27 ms. At 713, a bit map array table including each of the bitmaps (i.e., bitmap data) is generated. As noted above, the process disclosed in FIGS. 7C and 7D is particularly useful when applying multiple (more than one) filter criteria and parameter values. Since multiple filter criteria are being applied in the exemplary embodiment, the process returns to 711 for each of the different filter criteria being applied and generates a corresponding bit array map table at 713. Then, at 714, an operator (such as AND, OR, GREATER THAN, LESS THAN, etc.) is applied to the multiple bit array map tables having different filter criteria, and a transaction count is generated at 715. For example, the bitmap for each transaction T1-T6 in both tables 700 and 701 is respectively navigated to determine which of the transactions, for each parameter value, satisfies the applied filter criteria. Those transactions satisfying the filter criteria (those transactions having been marked with a "1") are "counted". This is performed for each of the bit array map tables generated, and an operator is applied at 714. Referencing FIG. 7A, the filter criteria selected is "duration" and the parameter value is "greater than 50" (table 700). In FIG. 7B, the filter criteria selected is "error" and the parameter value is "1 or greater" (table 701). When applying, for example, the operator "AND" to the bit map array tables, a final count satisfying both filter criteria is generated at 715. Notably, each transaction for each generated table appears in the same "position" even when different filter criteria are applied. For example, transaction T1 in table 700 is in the first bit position, and transaction T1 in table 701 is also in the first bit position. Thus, when applying the "AND" operator, a count for each transaction can be easily accomplished. For example, transaction T3 has a duration of 56 ms and 1 error. Thus, the filter criteria is satisfied since transaction T3 is greater than 50 ms (selected parameter value) and has 1 or more errors (filter criteria). Accordingly, the count value generated for transaction T3 is 1 (T3 is one transaction satisfying the filter criteria and parameter value). Each transaction is counted in a similar manner and a final count value for the transactions T1-T6 is generated at 715. Data may be stored in a database, such as database 122, for later retrieval.

As explained, the process is particularly useful when applying logical operators (such as AND, OR, etc.) between more than one filter (i.e., multiple filter criteria applied to the same transaction count data to generate the bitmap data). In one embodiment the bit array map table is implemented using NavigableMap, which permits the discovery of entries in the tables 700 and 701 including transactions that satisfy the filter criteria and parameter values. In one exemplary embodiment, the bit array map tables 700 and 701 are generated as follows. As previously explained, the transaction data (702) and transaction count data (710) are generated. The bit array map tables 700 and 701 are generated based on each of the different filter criteria and parameter values. In this example, multiple criteria are being applied. In bit array map table 700, the filter criteria is duration, and in bit array map table 701, the filter criteria is error. The parameter values (e.g., 27 ms, 45 ms and 56 ms) are the same for both tables in this example. In one exemplary embodiment, a first filter criteria is set as "duration" and has a selected value as the parameter value >50 ms (the parameter value has a selected value greater than 50 ms). Using the same transaction count data, a second filter criteria (FIG. 7D, repeat for different filter criteria) is set as "errors" greater than 2. Thus, as explained above, two bit array map tables are generated to determine which of the transactions T1-T6 satisfy the requirement that (1) duration >50 ms (e.g., bit array map table 700) and (2) errors >2 (e.g., bit array map table 701). Since the bit array map tables 700 and 701 are generated using the same transaction data, the applied range during transaction tracing of the original data set, as explained above with respect to FIGS. 3, 4 and 5, is also the same. Accordingly, each bit in the transactions T1-T6 of bit array map table 700 respectively corresponds with the same bit in transactions T1-T6 of bit array map table 701. That is, a bit "1" or "0" at a position 'N' (e.g., T1, T2 ... TN) in each bit array map table represents the same transaction in another bit array map table.

Figure 8:
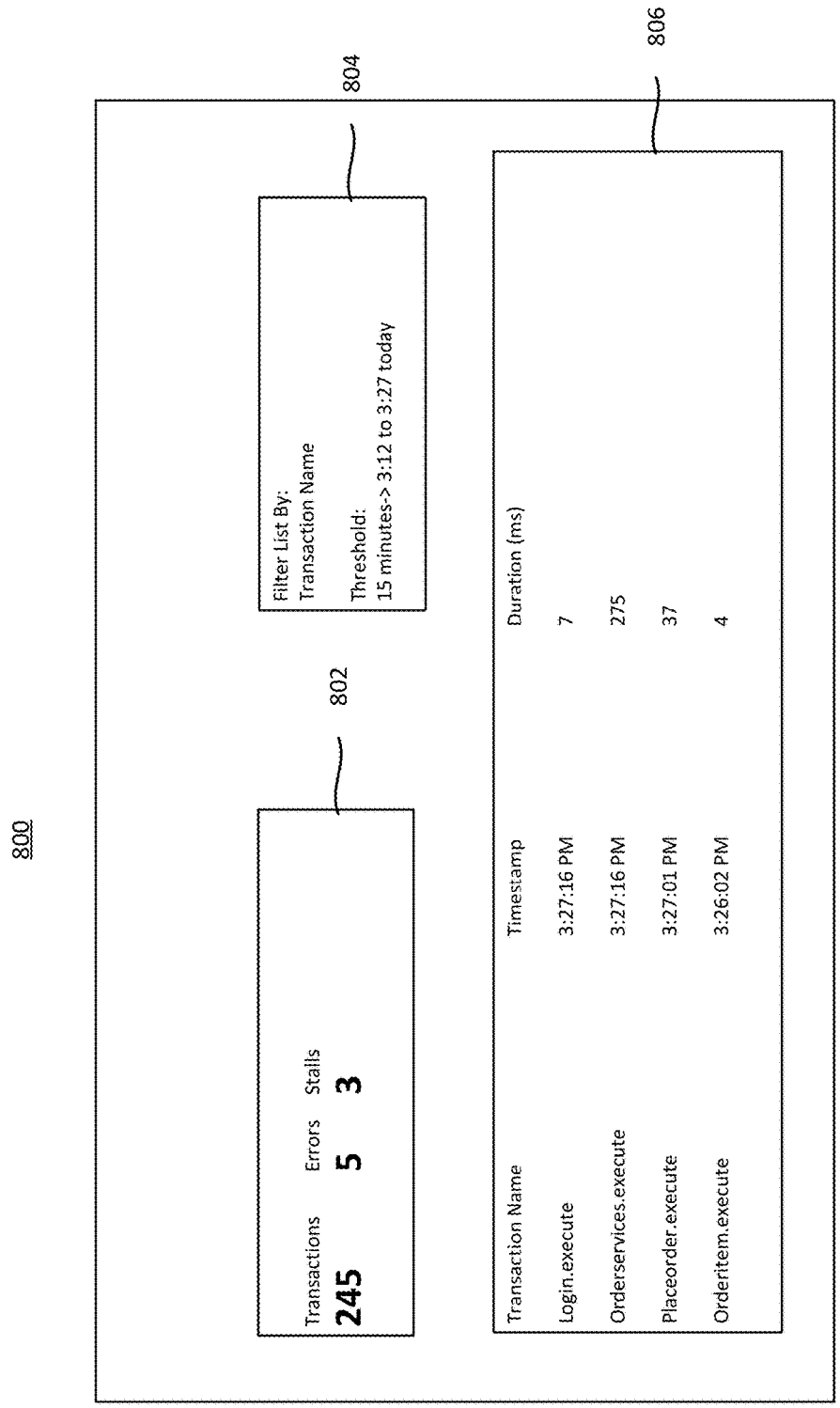
FIG. 8 discloses one embodiment of an interface illustrating the transaction count.

FIG. 8 discloses one embodiment of an interface illustrating the transaction count. Transaction interface 800 illustrates an exemplary interface, such as a graphical user interface (GUI), displaying a summary of counts and list of transactions resulting from the transaction tracing and query performed by the system depicted in FIG. 1. That is, FIG. 8 illustrates an interface that displays the final count for transactions satisfying various filter criteria that results from the processes disclosed in FIGS. 6A-6C and 7A-7D. In this example, the transaction query is composed of one or more filters applied together with an "AND" operation, similar to the description above with respect to FIGS. 7A-7D. The number of transaction counts, for example resulting from the query at 715 (FIG. 7D), are displayed on transaction interface 800 at interface portion 802, in which there is a total transaction count of 245, 5 of which have errors and 3 of which have stalls (it is noted that stalls may be another filter criteria applied to the transaction data, although not specifically disclosed in the figures of this specification). As displayed in interface portion 804, the transaction count being displayed in 802 has a filter criteria of 15 minutes (from 3:12 to 3:27 PM) and the transactions are displayed according to transaction name, timestamp and duration in 806.

FIG. 9 illustrates one embodiment of an exemplary format of transaction data using parameters. The formatted data depicted in FIG. 9 is an exemplary format of the various transaction data that is stored in the system, for example in database 122. The transaction data may be formatted as transaction summary data from received transactions, in which transaction envelope objects are used to gather information. For example, received transactions may be assigned to different summary data objects in the following manner. A transaction "start time" (typically assigned by Agent 8) is used to determine its summary data object's start time. Each data object may be assigned a "timeslice_timestamp" and timeslice_period". The number of transactions assigned to a single object may be limited, for example to a maximum of 10000, such that additional transactions will be assigned to different summary data objects having another "counter shard number." In this example transaction format, each summary data object has the format as illustrated in FIG. 9, although it is appreciated that the summary data objects are not limited to this particular format. A counter shard as defined in this document is a unique number for a same timeslice, in which summary data objects for the same timeslice and parameter can be generated in multiple to support late delivered transactions in which transactions have already been delivered into the same timeslice. Thus, the counter shard is provided to differentiate between the transactions. That is, assigning a counter shard number allows creating of multiple data objects for the same timeslice and parameter whenever the transactions are slowly received.

FIG. 10 discloses one embodiment of an exemplary table of performance results illustrating efficient transaction counting and storage efficiency. The table illustrated in the figure details the efficiency of processing data using the system and method depicted in FIG. 1, along with the processes described, for example, with reference to FIGS. 6A-6C and 7A-7D. The figure illustrates storage efficiency when using, for example, a bit array map as detailed with respect to the above disclosure in a compressed format. The table includes 7 columns: (1) number of bits (i.e., number of transactions assigned to a single object), (2) sparcity (i.e., number of bits "on" in a 32 bit fragment), (3) randomness (whether bits are randomly set), (4) total bits "on", (5) size of the bit-array, (6) "AND" cardinality response time and (7) "OR" cardinality response time. For example, using a compression technique on the bitmaps, such as Javaewah™ Compressed Bitmap (which is a compressed alternative to the Java BitSet class), improved query processing time from data stored in database may be achieved. In particular, for bitarrays having moderate to highly sparsed maps, memory consumption rates were exceptional. In one example depicted in the table, for a bitarray having 10,000 bits, with a sparsed map of 24, 2144 bits are "on" resulting in a bitarray size of 723. Response times for "AND" cardinality was 3 ms and for "OR" cardinality it was 0 ms. This is expressed in the last row of the table appearing in FIG. 10. It is appreciated that this figure is only one example of the efficiency using the system and method provided by this disclosure, and is not intended to limit the scope of the disclosure to only this example.

As a result of the system in method depicted in FIG. 1, and the processes represented in FIGS. 6A-6C and 7A-7D, transaction count data that satisfies a filter criteria may be generated and stored in a time-efficient manner. Rather than having to calculate the count of transactions for every transaction that occurs in a given data set, the data set is filtered down based on search (filter) criteria enabling the generation of a transaction count without having to processes every transaction in the data set. In this manner, the generation transaction count may be accomplished in a relatively constant time with moderate processing and memory usage.

In one embodiment, there is method of monitoring transaction data to determine a transaction count, comprising acquiring transaction data from a set of data, the transaction data comprising transactions occurring during a range; applying at least one of a filter criteria and a plurality of parameter values to the transaction data; forming an array comprised of each transaction and associated with the filter criteria and the plurality of parameter values; generating transaction count data comprising the filter criteria, the plurality of parameter values and the array, the transaction count data determinative of a total transaction count for the transaction data; and storing the transaction count data in storage comprising a database.

In another embodiment, there is an apparatus to monitor transaction data to determine a transaction count, comprising storage comprising a database, the database comprising a set of data; and a processor in communication with the storage, the processor: acquiring transaction data from the set of data, the transaction data comprising transactions occurring during a range; applying at least one of a filter criteria and a plurality of parameter values to the transaction data; forming an array comprised of each transaction and associated with the filter criteria and the plurality of parameter values; generating transaction count data comprising the filter criteria, the plurality of parameter values and the array, the transaction count data determinative of a total transaction count for the transaction data; and storing the transaction count data in the database.

In still another embodiment, there is a computer program product comprising a computer readable storage medium having computer readable program code embodied therewith, the computer readable program code comprising computer readable program code configured to acquire transaction data from a set of data, the transaction data comprising transactions occurring during a range; computer readable program code configured to apply at least one of a filter criteria and a plurality of parameter values to the transaction data; computer readable program code configured to form an array comprised of each transaction and associated with the filter criteria and the plurality of parameter values; computer readable program code configured to generate transaction count data comprising the filter criteria, the plurality of parameter values and the array, the transaction count data determinative of a total transaction count for the transaction data; and computer readable program code configured to store the transaction count data in a database.

The functionality described herein may be implemented using hardware, software or a combination of both hardware and software. For software, one or more non-transitory, tangible processor readable storage devices or apparatuses having processor readable code embodied thereon for programming one or more processors may be used. The non-transitory, tangible processor readable storage devices can include computer readable media such as volatile and non-volatile media, removable and non-removable media.

The flowchart and block diagrams in the FIGS. illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method of monitoring transaction data to determine a transaction count, comprising:
   acquiring transaction data from a set of data, the transaction data comprising transactions occurring during a range;
   applying at least one of a filter criteria and a plurality of parameter values to the transaction data;
   forming an array comprised of each transaction and associated with the filter criteria at a corresponding one of the plurality of parameter values;
   creating array data comprising multiple arrays, each array associated with the same filter criteria and a corresponding one of the plurality of parameter values;
   generating transaction count data comprising the filter criteria, the plurality of parameter values and the array, the transaction count data determinative of a total transaction count for the transaction data; and
   storing the transaction count data in storage comprising a database.

2. The method of claim 1, further comprising:
   querying the transaction count data associated with the filter criteria using a selected value;

determining the nearest least parameter value of the plurality of parameter values in the transaction count data to the selected value; and generating the transaction count for the selected value by subtracting a count value corresponding to the nearest least parameter value from a count value of a greatest parameter value in the transaction count data.

3. The method of claim 1, further comprising:

querying the transaction count data comprising the filter criteria using a selected value, wherein the array includes a bitmap and the array data includes bitmap data.

4. The method of claim 3, further comprising:

applying an operator to the multiple bitmap data, each of the multiple bitmap data associated with different filter criteria; and generating the transaction count based on a number of the transactions in each of the multiple bitmap data satisfying the operation.

5. The method according to claim 2, wherein the count value equals a number of the transactions in the array of bits satisfying the filter criteria at one of the plurality of parameter values.

6. The method of claim 2, wherein each array associated with one of the plurality of parameter values is an aggregation of a prior array in the transaction count data.

7. The method of claim 5, wherein the transaction count data is stored in a the database in a table format with the plurality of parameter values in one column and the array associated with each of the plurality of parameter values in another column.

8. The method of claim 3, wherein the bitmap data is stored in the database in a table format with the plurality of parameter values in one column and the bitmap associated with each of the plurality of parameter values in another column.

9. The method of claim 4, wherein each of the transactions in a first of the multiple bitmap data is at a same bit position as each of the transactions in a second of the multiple bitmap data.

10. The method of claim 1, wherein the transaction data is generated from monitoring an application.

11. The method of claim 1, wherein the generated transaction count data is used to determine the total transaction count.

12. The method of claim 1, further comprising generating the transaction data by monitoring a plurality of transactions and determining a number of transactions that run for greater than a threshold.

13. An apparatus to monitor transaction data to determine a transaction count, comprising:

computer readable storage comprising a database, the database comprising a set of data; and a processor in communication with the computer readable storage, the processor:

acquiring transaction data from the set of data, the transaction data comprising transactions occurring during a range;

applying at least one of a filter criteria and a plurality of parameter values to the transaction data;

forming an array comprised of each transaction and associated with the filter criteria at a corresponding one of the plurality of parameter values;

creating array data comprising multiple arrays, each array associated with the same filter criteria and a corresponding one of the plurality of parameter values;

generating transaction count data comprising the filter criteria, the plurality of parameter values and the array, the transaction count data determinative of a total transaction count for the transaction data; and storing the transaction count data in the database.

14. The apparatus of claim 13, the processor further comprising:

querying the transaction count data associated with the filter criteria using a selected value;

determining the nearest least parameter value of the plurality of parameter values in the transaction count data to the selected value; and generating the transaction count for the selected value by subtracting a count value corresponding to the nearest least parameter value from a count value of a greatest parameter value in the transaction count data.

15. The apparatus of claim 13, the processor further comprising:

querying the transaction count data comprising the filter criteria using a selected value, wherein the array includes a bitmap and the array data includes bitmap data.

16. The apparatus of claim 15, the processor further comprising:

applying an operator to the multiple bitmap data, each of the multiple bitmap data associated with different filter criteria; and generating the transaction count based on a number of the transactions in each of the multiple bitmap data satisfying the operation.

17. The apparatus according to claim 14, wherein the count value equals a number of the transactions in the array of bits satisfying the filter criteria at one of the plurality of parameter values.

18. The apparatus of claim 14, wherein each array associated with one of the plurality of parameter values is an aggregation of a prior array in the transaction count data.

19. The apparatus of claim 17, wherein the transaction count data is stored in the database in a table format with the plurality of parameter values in one column and the array associated with each of the plurality of parameter values in another column.

20. The apparatus of claim 15, wherein the bitmap data is stored in the database in a table format with the plurality of parameter values in one column and the bitmap associated with each of the plurality of parameter values in another column.

21. The apparatus of claim 16, wherein each of the transactions in a first of the multiple bitmap data is at a same bit position as each of the transactions in a second of the multiple bitmap data.

22. The apparatus of claim 13, wherein the transaction data is generated from monitoring an application.

23. The apparatus of claim 13, wherein the generated transaction count data is used to determine the total transaction count.

24. A computer program product comprising:

a non-transitory computer readable storage medium having computer readable program code embodied therewith, the computer readable program code comprising:

computer readable program code configured to acquire transaction data from a set of data, the transaction data comprising transactions occurring during a range;

computer readable program code configured to apply at least one of a filter criteria and a plurality of parameter values to the transaction data;

computer readable program code configured to form an array comprised of each transaction and associated with the filter criteria at a corresponding one of the plurality of parameter values;

computer readable program code configured to create array data comprising multiple arrays, each array associated with the same filter criteria and a corresponding one of the plurality of parameter values;

computer readable program code configured to generate transaction count data comprising the filter criteria, the plurality of parameter values and the array, the transaction count data determinative of a total transaction count for the transaction data; and computer readable program code configured to store the transaction count data in a database computer readable program code configured to create bitmap data comprising multiple bitmaps, each bitmap associated with the same filter criteria and a corresponding one of the plurality of parameter values.

25. The computer program product of claim 23, the computer readable program code further comprising:

computer readable program code configured to query the transaction count data associated with the filter criteria using a selected value;

computer readable program code configured to determine the nearest least parameter value of the plurality of parameter values in the transaction count data to the selected value; and computer readable program code configured to generate the transaction count for the selected value by subtracting a count value corresponding to the nearest least parameter value from a count value of a greatest parameter value in the transaction count data.

26. The computer program product of claim 23, the computer readable program code further comprising:

computer readable program code configured to query the transaction count data comprising the filter criteria using a selected value, wherein the array includes a bitmap and the array data includes bitmap data.

27. The computer program product of claim 25, the computer readable program code further comprising:

computer readable program code configured to apply an operator to the multiple bitmap data, each of the multiple bitmap data associated with different filter criteria; and computer readable program code configured to generate the transaction count based on a number of the transactions in each of the multiple bitmap data satisfying the operation.

* * * * *